United States Patent
Hirai et al.

(10) Patent No.: US 8,761,492 B2
(45) Date of Patent: Jun. 24, 2014

(54) DEPTH CORRECTION APPARATUS AND METHOD

(75) Inventors: Ryusuke Hirai, Tokyo (JP); Nao Mishima, Inagi (JP); Takeshi Mita, Yokohama (JP); Masahiro Baba, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 405 days.

(21) Appl. No.: 13/181,888

(22) Filed: Jul. 13, 2011

(65) Prior Publication Data

US 2012/0082368 A1 Apr. 5, 2012

(30) Foreign Application Priority Data

Sep. 30, 2010 (JP) ................................. 2010-221594

(51) Int. Cl.
*G06K 9/00* (2006.01)
*G06K 9/62* (2006.01)

(52) U.S. Cl.
USPC ............ 382/154; 362/224; 362/225; 362/103

(58) Field of Classification Search
None
See application file for complete search history.

(56) References Cited

U.S. PATENT DOCUMENTS

| | | | | |
|---|---|---|---|---|
| 6,445,833 B1 * | 9/2002 | Murata et al. | ................. | 382/285 |
| 6,584,219 B1 * | 6/2003 | Yamashita et al. | ............ | 382/154 |
| 8,131,098 B2 * | 3/2012 | Watanabe et al. | ............. | 382/254 |
| 8,345,956 B2 * | 1/2013 | Ward et al. | .................... | 382/154 |
| 8,379,919 B2 * | 2/2013 | Bronder et al. | ............... | 382/103 |
| 8,395,642 B2 * | 3/2013 | Yea et al. | ...................... | 345/647 |
| 8,411,932 B2 * | 4/2013 | Liu et al. | ....................... | 382/154 |
| 8,515,134 B2 * | 8/2013 | Barenbrug et al. | ........... | 382/107 |
| 2009/0129667 A1 * | 5/2009 | Ho et al. | ........................ | 382/154 |
| 2009/0324073 A1 * | 12/2009 | Wengler et al. | ............... | 382/168 |
| 2010/0073521 A1 * | 3/2010 | Gomi et al. | .................... | 348/235 |
| 2010/0074521 A1 * | 3/2010 | Gomi et al. | .................... | 382/167 |

(Continued)

FOREIGN PATENT DOCUMENTS

| JP | 6-203172 | 7/1994 |
|---|---|---|
| JP | 2003-209858 | 7/2003 |

(Continued)

OTHER PUBLICATIONS

First Office Action issued by Japanese Patent Office in Japanese Patent Application No. 2010-221594, mailed Aug. 23, 2012 (3 pages).

(Continued)

*Primary Examiner* — Stephen R Koziol
*Assistant Examiner* — Sean Conner
(74) *Attorney, Agent, or Firm* — Finnegan, Henderson, Farabow, Garrett & Dunner, LLP

(57) ABSTRACT

According to one embodiment, a depth correction apparatus includes a clusterer, a calculator and a corrector. The clusterer is configured to apply clustering to at least one of pixel values and depth values of a plurality of pixels in a calculation range corresponding to a correction target pixel, and to classify the plurality of pixels in the calculation range into a plurality of classes. The calculator is configured to calculate pixel value statistics of the respective classes using pixel values of pixels in the respective classes. The corrector is configured to determine a corresponding class of the correction target pixel based on a pixel value of the correction target pixel and the pixel value statistics of the respective classes, and to apply correction which replaces a depth value of the correction target pixel by a representative depth value of the corresponding class.

13 Claims, 14 Drawing Sheets

(56) References Cited

U.S. PATENT DOCUMENTS

| | | | |
|---|---|---|---|
| 2010/0111417 A1* | 5/2010 | Ward et al. .................... | 382/173 |
| 2010/0215251 A1* | 8/2010 | Klein Gunnewiek et al. .............................. | 382/154 |
| 2011/0142289 A1* | 6/2011 | Barenbrug et al. ............ | 382/107 |
| 2011/0234756 A1* | 9/2011 | Adler et al. ...................... | 348/46 |
| 2011/0242104 A1* | 10/2011 | Zhang et al. .................. | 345/419 |
| 2013/0058562 A1* | 3/2013 | Chen et al. .................... | 382/154 |
| 2013/0136338 A1* | 5/2013 | Asente et al. ................. | 382/154 |

FOREIGN PATENT DOCUMENTS

| | | |
|---|---|---|
| JP | 2004-145448 | 5/2004 |
| JP | 2005-44211 | 2/2005 |
| JP | 2007-280291 | 10/2007 |
| JP | 2008-45974 | 2/2008 |
| JP | 2010-186272 | 8/2010 |
| WO | WO 2010-035223 A1 | 4/2010 |
| WO | WO 2010-064118 A1 | 6/2010 |

OTHER PUBLICATIONS

Gangwal, O. P. et al., "Depth Map Post-Processing for 3D-TV," ICCE 09, Digest of Technical Papers International Conference, No. 4, 4-3, 2 sheets, (2009).

\* cited by examiner

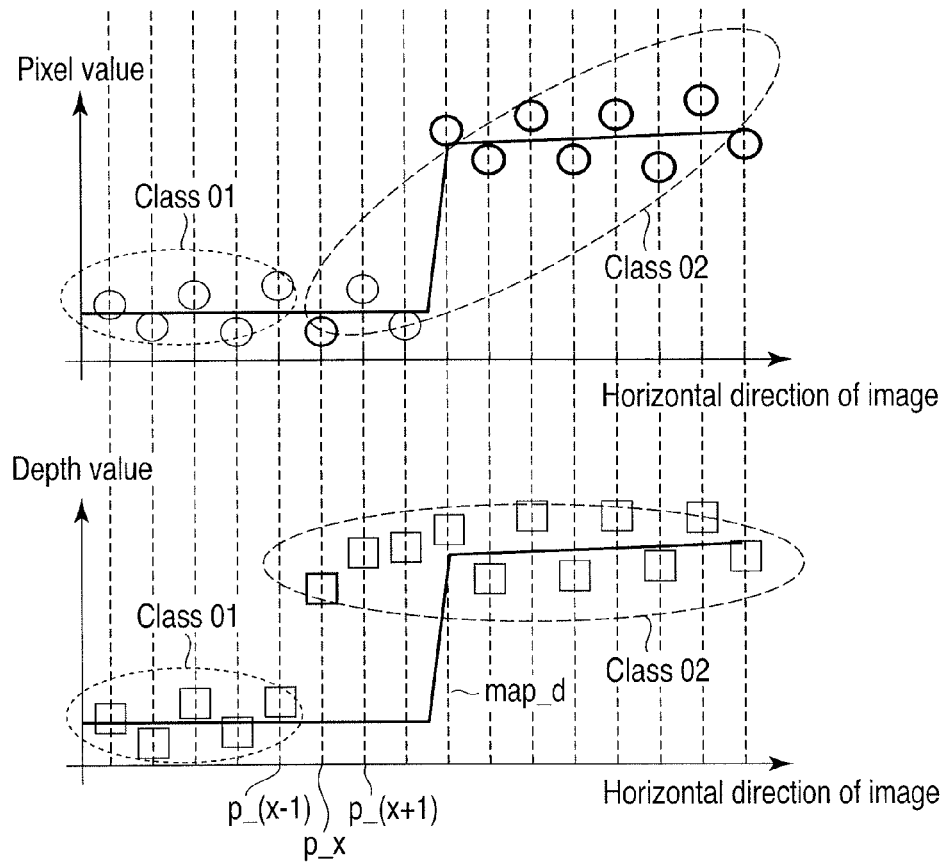
F I G. 8
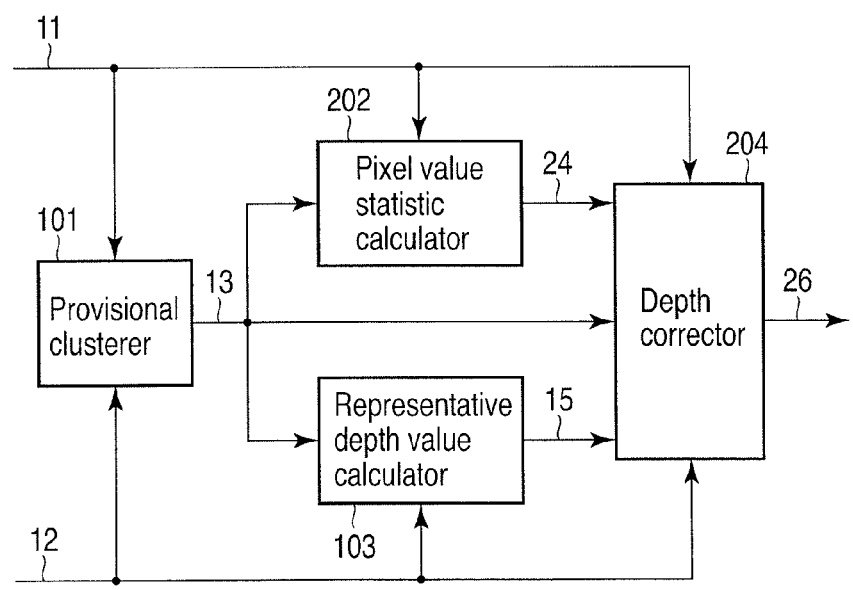
F I G. 9

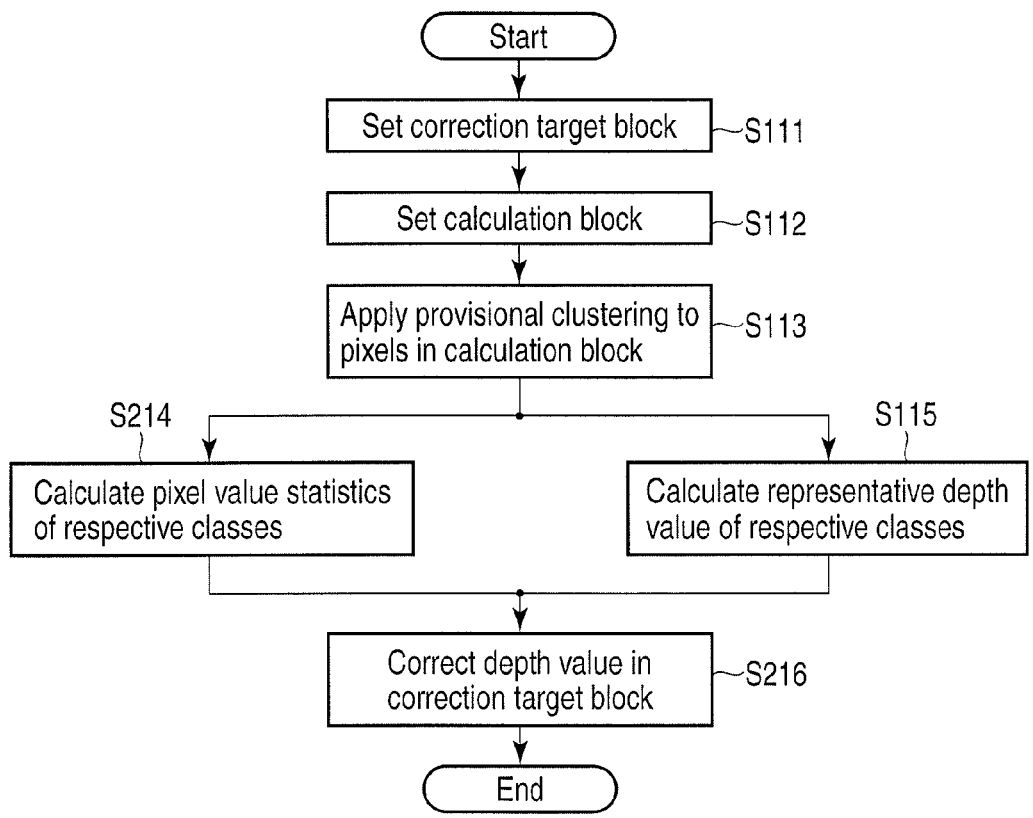
F I G. 1 0

DEPTH CORRECTION APPARATUS AND METHOD

CROSS-REFERENCE TO RELATED APPLICATIONS

This application is based upon and claims the benefit of priority from Japanese Patent Application No. 2010-221594, filed Sep. 30, 2010; the entire contents of which are incorporated herein by reference.

FIELD

Embodiments described herein relate generally to depth correction.

BACKGROUND

A method of generating a three-dimensional (3D) video content based on a two-dimensional (2D) video (still image or moving picture) content has been proposed. This method generates parallax images for stereoscopic viewing from 2D images included in the 2D video content using depth maps. Each depth map specifies depth values assigned to respective pixels of a 2D image. The depth maps may be automatically estimated from the 2D images or may be manually created. Parallax amounts of respective pixels can be uniquely derived from depth values according to a geometric relationship. This method generates parallax images by warping respective pixels of the 2D images according to their parallax amounts.

Furthermore, a method of adjusting the strength of the stereoscopic effect of a 3D video content (that is, broadening or narrowing down the dynamic range of depth values) has also been proposed. When the stereoscopic effect is emphasized, the 3D video content becomes more powerful. When the stereoscopic effect is suppressed, user's fatigue as a result of viewing of the 3D video content can be reduced. This method estimates depth maps of 3D images included in the 3D video contents by, for example, stereo matching. This method creates parallax images after desired adjustment is applied to the estimated depth maps.

The estimated depth maps may include errors. For example, background depth values may be assigned to foreground pixels, or foreground depth values may be assigned to background pixels. When such estimation errors occur in the vicinity of a boundary (for example, an object contour) between a foreground and background, parallax images including boundary lines which suffer jaggies between the foreground and background are created, thus deteriorating the quality of 3D images. As for the possibility of errors included in depth values, the same applies to the case in which the depth maps are manually created.

BRIEF DESCRIPTION OF THE DRAWINGS

FIG. 8 is an explanatory view of the effects of the depth correction apparatus shown in FIG. 6;

FIG. 9 is a block diagram showing an example of a depth correction apparatus according to the second embodiment;

FIG. 10 is a flowchart showing an example of the operation of the depth correction apparatus shown in FIG. 9;

DETAILED DESCRIPTION

Figure 1:
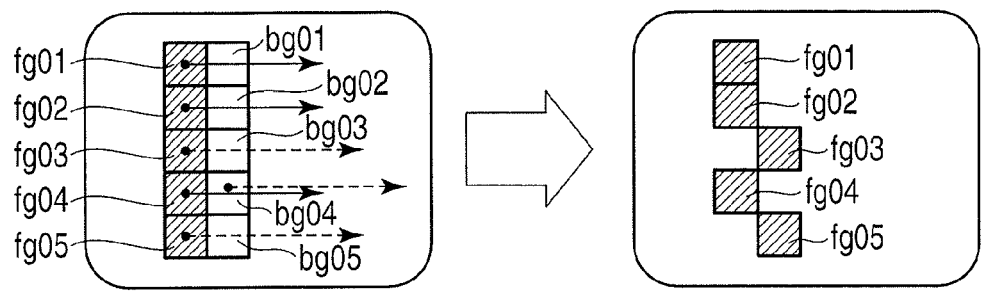
FIG. 1 is an explanatory view of the influence of errors of depth values.

Various embodiments will be described hereinafter with reference to the accompanying drawings.

In general, according to one embodiment, a depth correction apparatus includes a clusterer, a first calculator, a second calculator and a corrector. The clusterer is configured to apply clustering to at least one of pixel values and depth values of a plurality of pixels in a calculation range corresponding to a correction target pixel, and to classify the plurality of pixels in the calculation range into a plurality of classes. The first calculator is configured to calculate pixel value statistics of the respective classes using pixel values of pixels in the respective classes. The second calculator is configured to calculate representative depth values of the respective classes using depth values of pixels in the respective classes. The corrector is configured to determine a corresponding class of the correction target pixel based on a pixel value of the correction target pixel and the pixel value statistics of the respective classes, and to apply correction which replaces a depth value of the correction target pixel by a representative depth value of the corresponding class.

Note that the same or similar reference numerals denote elements which are the same as or similar to already described elements in the following description, and a repetitive description thereof will be basically avoided.

Figure 3:
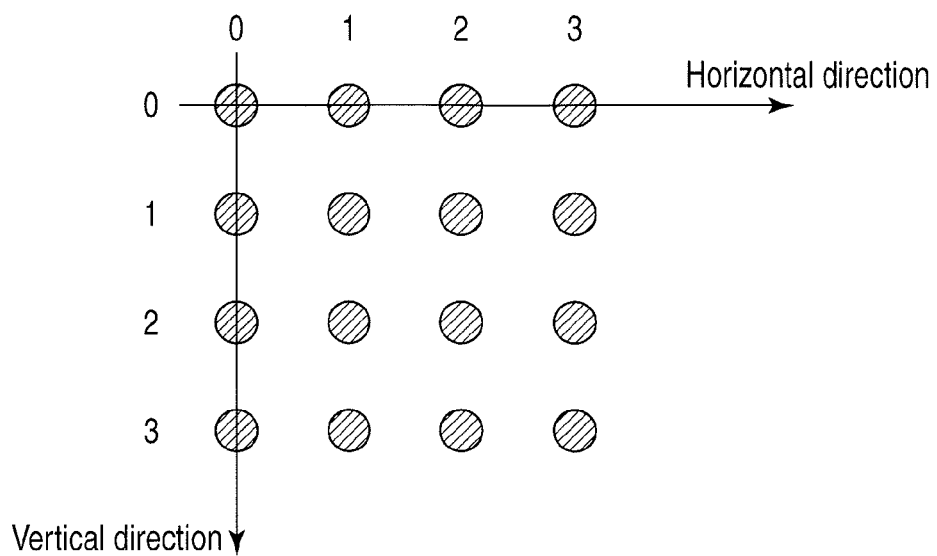
FIG. 3 is an explanatory view of pixel positions in a 2D image.

In respective embodiments, a 2D image 11 includes a plurality of pixels (circular marks in FIG. 3) arranged in the horizontal and vertical directions, as shown in FIG. 3. A position vector of each pixel is expressed by (x, y) having (0, 0) as an origin unless otherwise specified. x and y respectively indicate horizontal and vertical coordinates. Also, both of x and y assume integer values.

In respective embodiments, a pixel value (or it can be read as color information) indicates, for example, some or all of RGB signal values, UV signal (color difference signal) values or a Y signal (luminance signal) value of YUV signals obtained by converting RGB signals, and signal values of uniform color spaces LUV and Lab. Note that signal values defined by color spaces different from the color spaces enumerated here can also be handled as a pixel value.

An (initial) depth value of each pixel of the 2D image 11 is specified by an initial depth map 12. Parallax amounts of respective pixels can be uniquely derived from depth values according to a geometric relationship. As will be described below using FIGS. 4 and 5, a parallax amount of a target pixel can be uniquely derived from a depth value.

Figure 4:
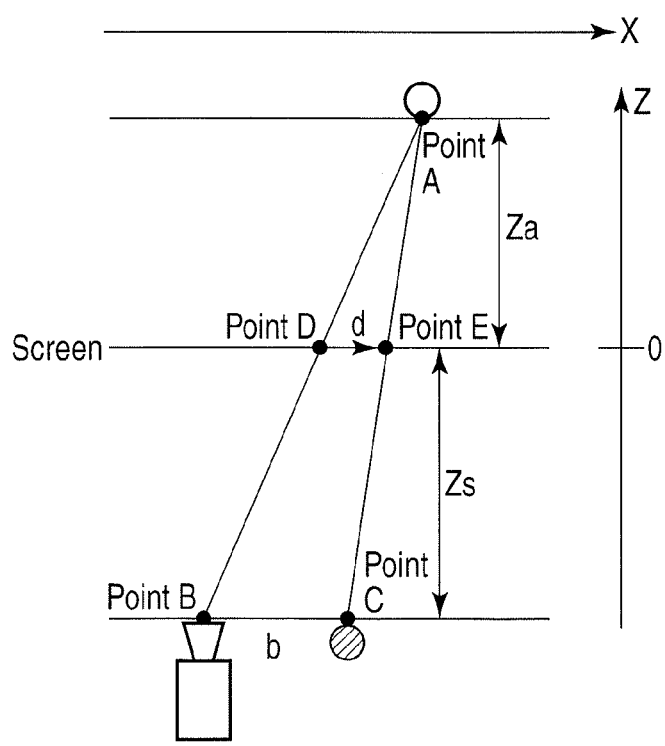
FIG. 4 is an explanatory view of a parallax vector of a background pixel.
Figure 5:
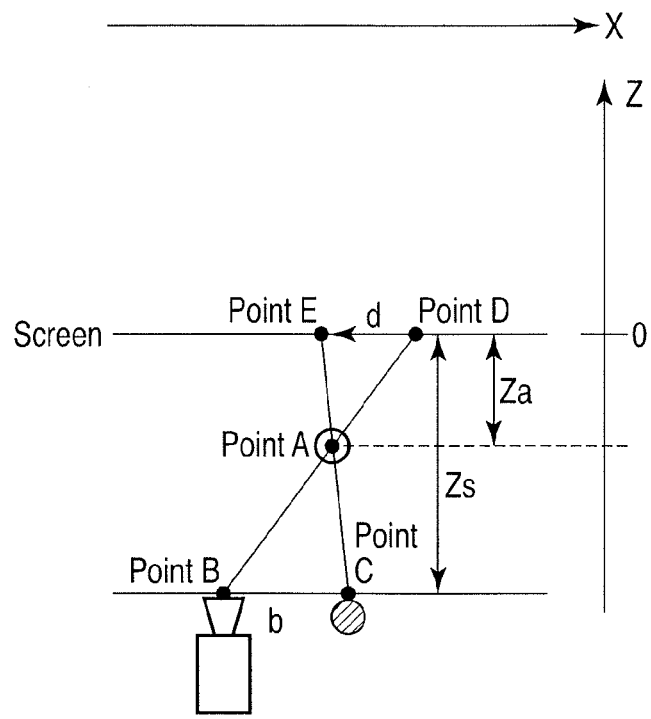
FIG. 5 is an explanatory view of a parallax vector of a foreground pixel.

In FIGS. 4 and 5, a point A represents a position on a depth space of a target pixel (in the example of FIG. 4, a background pixel which is arranged on the back side of a screen; in the example of FIG. 5, a foreground pixel which is arranged on the front side of the screen). A line which passes through points D and E represents a screen (a horizontal line thereof) of a display device. A point B represents an image capturing position (or it may be read as a viewpoint) of the 2D image 11. A point C represents an image capturing position corresponding to a parallax image. A point D represents a position of the target pixel on the 2D image 11, and a point E represents a position of the target pixel on the parallax image. This example assumes a geometric relationship indicating that a line which connects between the image capturing positions is parallel to the horizontal line of the screen. Therefore, a line which passes through the points B and C is parallel to that which passes through the points D and E. Let Zs be a distance from the image capturing position to the screen, and b be a distance between the points B and C.

This example defines a Z axis which extends from the image capturing position (the point B or C) toward the screen, and is perpendicular to the horizontal direction of the screen. A Z coordinate of the screen position is zero. A depth value Za is defined on the Z axis. That is, the depth value Za assumes a positive value in the example of FIG. 4, and a negative value in the example of FIG. 5. Furthermore, this example defines an X axis which extends from the point B toward the point C, and is parallel to the horizontal direction of the screen. A vector d which has the point D as a start point and the point E as an end point represents a parallax vector. The amplitude of the parallax vector d is a parallax amount. In the example of FIG. 4, the parallax vector d has a positive direction. In the example of FIG. 5, the parallax vector d has a negative direction.

According to the aforementioned geometric relationship, triangles ADE and ABC in FIG. 4 are similar. Therefore, |d|:b=|Za|:|Za|+Zs holds. That is, expression (1) below is derived:

$$|d| = b \frac{|Z_a|}{|Z_a| + Z_s} \quad (1)$$

Also, in FIG. 5, triangles ADE and ABC are similar. Therefore, |d|:b=|Za|:−|Za|+Zs holds. In this case, from the aforementioned definitions of the X and Z axes, for both FIGS. 4 and 5, expression (2) below holds.

$$d = b \frac{Z_a}{Z_a + Z_s} \quad (2)$$

As described above, the parallax vector d (and parallax amount) can be uniquely derived from the depth value Za. Also, by modifying expression (2), the depth value Za can be uniquely derived from the parallax vector d. Therefore, in the following description, a description about the parallax vector (or depth value) can also be read as that of the depth value (or parallax vector) as needed. Note that the geometric relationship assumed for the purpose of deriving the parallax vector in the above description is an example. However, even when other geometric relationships are assumed, the parallax vector can be uniquely derived from the depth value.

(First Embodiment)

Figure 6:
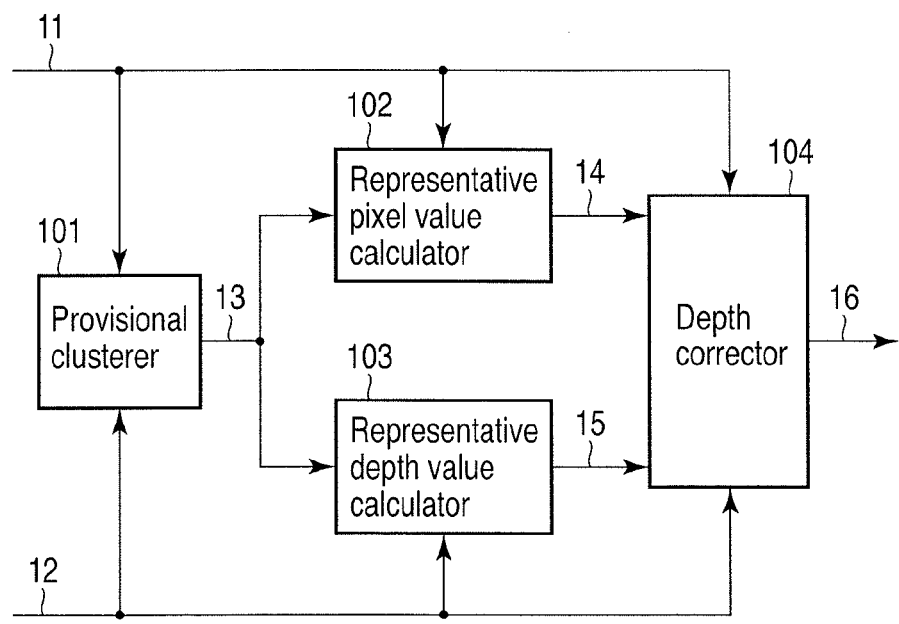
FIG. 6 is a block diagram showing an example of a depth correction apparatus according to the first embodiment.

As shown in FIG. 6, a depth correction apparatus according to the first embodiment includes a provisional clusterer 101, representative pixel value calculator 102, representative depth value calculator 103, and depth corrector 104. The depth correction apparatus shown in FIG. 6 receives, as inputs, the 2D image 11 and the initial depth map 12 which specifies (initial) depth values of respective pixels of the 2D image 11, and obtains a corrected depth map 16.

In the initial depth map 12, erroneous depth values may be assigned to some pixels. FIG. 1 exemplifies foreground pixels fg01, . . . , fg05, and background pixels bg01, . . . , bg05. Background depth values (that is, background parallax vectors) are erroneously assigned to the foreground pixels fg03 and fg05 of the foreground pixels fg01, . . . , fg05. Note that in FIG. 1, solid arrows represent foreground parallax vectors, and dotted arrows represent background parallax vectors. Therefore, in a parallax image, the pixels fg03 and fg05 are warped to erroneous positions, and a boundary between the foreground pixels fg01, . . . , fg05, and background pixels bg01, . . . , bg05 suffers jaggies. The depth correction apparatus shown in FIG. 6 corrects such estimation errors in the initial depth map 12.

The provisional clusterer 101 acquires the 2D image 11 and initial depth map 12. The provisional clusterer 101 applies clustering to at least either of pixel values and depth values of a plurality of pixels in a calculation block (to be described later) of the 2D image 11, and classifies this plurality of pixels into K (K is an integer equal to or larger than 2) classes. The provisional clusterer 101 assigns label information 13 indicating a belonging class to each of the plurality of pixels in the calculation block. The provisional clusterer 101 notifies the representative pixel value calculator 102 and representative depth value calculator 103 of this label information 13.

One or a plurality of pixels in the 2D image 11 are designated as a correction target block. In the following description, the correction target block is a rectangular pixel set having an m×n size (m≥1 and n≥1) (or one pixel). Furthermore, a plurality of pixels corresponding to this correction target block are designated as the calculation block. In the following description, the calculation block is a rectangular pixel set having an M×N size (M≥1 and N≥1 where at least one of M and N is equal to or larger than 2). The calculation block typically includes the correction target block. However, the calculation block need not always include all pixels of the correction target block. For the sake of simplicity, the rectangular pixel sets (the correction target block and calculation block) are assumed. However, the shapes of these pixel sets are not limited to a rectangle, but they may be handled as a correction target range and calculation range having an arbitrary shape.

When the correction target block is sequentially moved so that all pixels in the 2D image 11 are included at least once in the correction target block, the entire depth map can be corrected. Note that the depth map may be corrected only for a partial region (for example, a region in the vicinity of an object boundary) in the 2D image 11. In such case, the correction target block need only be sequentially moved, so that all pixels in the partial region are included at least once in the correction target block.

A value of K may assume 3 or more. However, since the calculation block is a local region inside the 2D image 11, it normally includes one object contour at most. Therefore, by setting the value of K to be 2, effective correction can be expected while facilitating clustering.

When K=2, clustering for depth values (or one-dimensional pixel value vectors of, for example, luminance values) can be implemented, for example, as follows.

The provisional clusterer 101 calculates an average value or median value of depth values of a plurality of pixels in the calculation block. The provisional clusterer 101 uses the calculated average value or median value as a threshold, and classifies the plurality of pixels in the calculation block into a class in which a depth value is larger than the threshold and that in which a depth value is equal to or smaller than the threshold. Note that the threshold is not limited to the average value or median value. For example, the threshold may be an average value of maximum and minimum values of depth values of a plurality of pixels in the calculation block (that is, ½ of a sum of the maximum and minimum values).

When K≥3, or when clustering is applied to both depth values and pixel values, or when clustering is applied to pixel values each including two or more components, the provisional clusterer 101 may use, for example, a K-means method. An overview of the K-means method will be described below.

In the following description, a pixel vector as a clustering target is specified. An element of the pixel vector is at least one of depth and pixel values. This example defines a pixel vector of a pixel specified by a position vector i using:

$$\varphi(i)=(I(i),z(i)) \quad (3)$$

where z(i) represents a depth value of a pixel specified by the position vector i, and I(i) represents a pixel value vector of the pixel specified by the position vector i. I(i) may be a three-dimensional vector if the pixel value represents RGB values or may be a one-dimensional vector if it represents a luminance value. Note that the K-means method can be applied even when the pixel vector is defined to be different from expression (3). For example, the depth value z(i) or pixel value vector I(i) may be removed from expression (3).

Clustering based on the K-means method is implemented by steps 1, 2, and 3 below. Note that the following description will be given under the assumption that K=2 for the sake of simplicity.

However, K can be expanded to 3 or more, as will be described later.

The provisional clusterer 101 provisionally assigns label information of an arbitrary class to each of a plurality of pixels in the calculation block (step 1). That is, the provisional clusterer 101 provisionally sets LABEL(i)=k (k=0, 1, . . . , K−1) for the plurality of pixels in the calculation block. LABEL(i) represents label information assigned to a pixel of the position vector i. Note that label information to be assigned to pixels can be arbitrarily selected. For example, randomly selected label information can be assigned to an arbitrary pixel. After the label information is assigned to each of all the pixels in the calculation block, the process advances to step 2.

In step 2, the provisional clusterer 101 calculates barycentric vectors of respective classes. More specifically, the provisional clusterer 101 calculates the barycentric vectors of the respective classes according to:

$$k\_mean(k) = \frac{1}{N(k)} \sum_{i \in B_c(k)} \varphi(i) \quad (4)$$

where k_mean(k) represents the barycentric vector of a class indicated by label information (=k). Bc(k) represents a set of pixels to which the label information (=k) is assigned in the calculation block. N(k) represents the total number of pixels to which the label information (=k) is assigned (that is, the total number of elements of Bc(k)).

After the barycentric vectors of all the classes are calculated, the process advances to step 3.

In step 3, the provisional clusterer 101 re-sets labels of the plurality of pixels in the calculation block according to distances between the pixel vectors and the barycentric vectors of the respective classes. More specifically, the provisional clusterer 101 re-sets the label information of each of the plurality of pixels in the calculation block according to:

$$LABEL(i) = \operatorname*{argmin}_{k} |\varphi(i) - k\_mean(k)|_2 \quad (5)$$

Note that expression (5) evaluates a distance between the pixel vector and barycentric vector using the L2 norm, but the L1 norm may be used in evaluation.

As a result of re-setting of the label information, if label information of at least one pixel in the calculation block is changed, the process returns to step 2. On the other hand, as a result of re-setting of the label information, if the pieces of label information of all the pixels in the calculation block are maintained without being changed, the process ends (the label information 13 of each pixel is settled).

Note that when K is expanded to 3 or more in the K-means method, three or more labels can be simply assigned in step 1 described above. Alternatively, K may be expanded by combining the aforementioned clustering method to two classes to the K-means method. For example, after pixels are classified into a plurality of classes by the K-means method, for example, an average value of depth values (or one-dimensional pixel vectors) of pixels of each class is used as a threshold to further segment each class into two classes. According to this method, the total number of classes classified by the K-means method can be recursively expanded to twice, four times, eight times, . . . (that is, power multiples of 2).

The representative pixel value calculator 102 acquires the 2D image 11 and label information 13. The representative pixel value calculator 102 calculates a representative pixel value 14 for each class according to the label information 13. The representative pixel value calculator 102 inputs the representative pixel values 14 of respective classes to the depth corrector 104.

More specifically, the representative pixel value calculator 102 calculates a representative pixel value (vector) Ir(k) of a class indicated by label information (=k) using pixel values of pixels to which the label information (=k) is assigned in the calculation block according to expression (6) or (7) below.

$$Ir(k) = \frac{1}{N(k)} \sum_{i \in B_C(k)} I(i) \quad (6)$$

$$Ir(k) = \arg\min_{i \in B_C(k)} \sum_{j \in B_C(k)} |I(i) - I(j)|_2 \quad (7)$$

According to expression (6), an average value of the pixel values of the pixels to which the label information (=k) is assigned is used as the representative pixel value 14. According to expression (7), a median value of the pixel values of the pixels to which the label information (=k) is assigned is used as the representative pixel value 14. In this case, j represents a position vector of each pixel as in i. Note that in expression (7), the L1 norm may be used in place of the L2 norm.

The representative depth value calculator 103 acquires the initial depth map 12 and label information 13. The representative depth value calculator 103 calculates a representative depth value 15 for each class according to the label information 13. The representative depth value calculator 103 inputs the representative depth values 15 of respective classes to the depth corrector 104.

More specifically, the representative depth value calculator 103 calculates a representative depth value zr(k) of a class indicated by label information (=k) using depth values of pixels to which the label information (=k) is assigned in the calculation block according to expression (8) or (9) below:

$$zr(k) = \frac{1}{N(k)} \sum_{i \in B_C(k)} z(i) \quad (8)$$

$$zr(k) = \arg\min_{i \in B_C(k)} \sum_{j \in B_C(k)} |z(i) - z(j)|_2 \quad (9)$$

According to expression (8), an average value of depth values of pixels to which the label information (=k) is assigned is used as the representative depth value 15. According to expression (9), a median value of depth values of pixels to which the label information (=k) is assigned is used as the representative depth value 15. Note that in expression (9), the L1 norm may be used in place of the L2 norm.

The depth corrector 104 determines a corresponding class of a correction target pixel in the correction target block based on a pixel value of the correction target pixel and the representative pixel values 14 of respective classes. Note that the corresponding class of the correction target pixel does not always match the class indicated by the label information 13 assigned to the correction target pixel. For example, the depth corrector 104 determines a class having the representative pixel value 14 which has a smallest distance from the pixel value of the correction target pixel as a corresponding class of the correction target pixel. The depth corrector 104 replaces a depth value of the correction target pixel by the representative depth value 15 of the corresponding class. The depth corrector 104 obtains the corrected depth map 16 of the correction target block by replacing depth values of all correction target pixels in the correction target block by the representative depth values 15 of their corresponding classes.

More specifically, the depth corrector 104 replaces a depth value z(i) of the correction target pixel of the position vector i by the representative depth value 15 of the corresponding class according to:

$$z(i) = zr\left(\arg\min_k |I(i) - Ir(k)|_2\right) \quad (10)$$

Note that in expression (10), the L1 norm may be used in place of the L2 norm. The depth corrector 104 corrects a depth value of each correction target pixel in the correction target block to the representative depth value 15 of any class.

Figure 7:
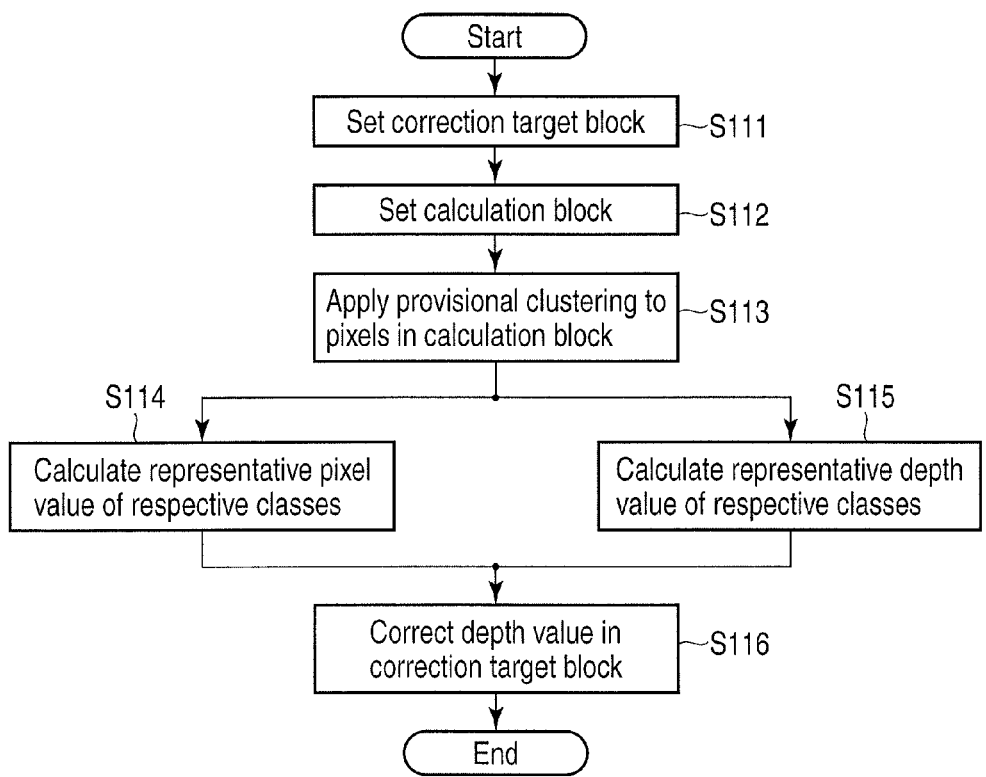
FIG. 7 is a flowchart showing an example of the operation of the depth correction apparatus shown in FIG. 6.

An exemplary operation of the depth correction apparatus shown in FIG. 6 will be described below with reference to FIG. 7. When the processing in FIG. 7 starts, a correction target block is set (step S111), and a calculation block corresponding to this correction target block is set (step S112). Steps S111 and S112 may be performed by the provisional clusterer 101 or another element (not shown).

The provisional clusterer 101 acquires the 2D input image 11 and initial depth map 12, and applies provisional clustering to a plurality of pixels in the calculation block set in step S112 (step S113). As a result of the provisional clustering in step S113, the label information 13 is individually assigned to each of the plurality of pixels in the calculation block.

The representative pixel value calculator 102 calculates representative pixel values 14 of respective classes according to the pieces of label information 13 assigned in step S113 (step S114). On the other hand, the representative depth value calculator 103 calculates representative depth values 15 of respective classes according to the pieces of label information 13 assigned in step S113 (step S115). Note that steps S114 and S115 may be performed parallelly, as shown in FIG. 7, or either one step may be performed prior to the other.

After steps S114 and S115, the depth corrector 104 corrects depth values of respective correction target pixels in the correction target block (step S116), thus ending the processing. As described above, the depth corrector 104 determines a corresponding class of a correction target pixel based on a pixel value of the correction target pixel in the correction target block and the representative pixel values 14 of respective classes, and replaces a depth value of the correction target pixel by the representative depth value 15 of the corresponding class.

As a comparative example to this embodiment, depth map correction using a Cross-Bilateral filter will be assumed. The Cross-Bilateral filter gives weights to surrounding pixels of a correction target pixel, and performs a convolution operation of depth values. The weights given to the surrounding pixels are decided based on differences of pixel values from the correction target pixel and spatial distances from the correction target pixel.

Figure 2:
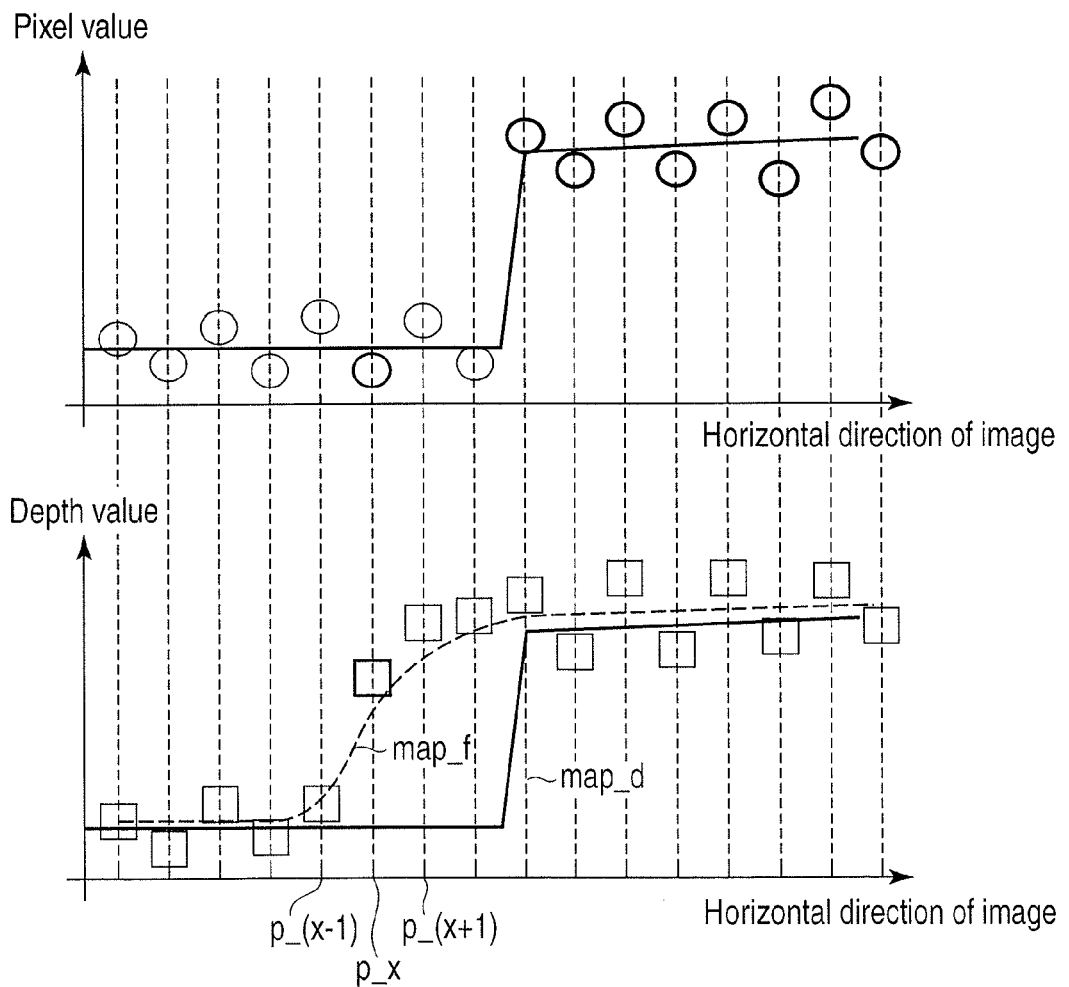
FIG. 2 is an explanatory view of a depth map obtained by filtering processing.

FIG. 2 exemplifies pixel values (circular marks) and initial depth values (square marks) of respective pixels within a predetermined range. Note that FIG. 2 and other drawings to be described later express pixel positions by one dimension for the sake of simplicity. However, the same discussion applies even when the pixel positions are expanded to two dimensions.

In FIG. 2, a pixel p_x is assigned an initial depth value closer to those of pixels located across an object contour. Furthermore, a pixel p_(x+1) which neighbors the pixel p_x is assigned an initial depth value closer to those of pixels located across the object contour. That is, in the example of FIG. 2, the initial depth values of the pixels p_x and p_(x+1) are likely to include errors.

Since neighboring pixels p_(x+1) and p_(x−1) of the pixel p_x both have small pixel value differences from the correction target pixel p_x and small distances from the correction target pixel p_x, large weights are given to these neighboring pixels. As described above, since the initial depth value of the neighboring pixel p_(x+1) includes an error, this error remains in the depth value after filtering of the pixel p_x. Therefore, even when the Cross-Bilateral filter is applied to the correction target pixel p_x in such situation, it is difficult to largely improve an error included in the initial depth value of the correction target pixel p_x. For example, as shown in FIG. 2, a depth map map_f obtained after application of the Cross-Bilateral filter is separated from a desired depth map map_d. In this case, the desired depth map map_d means a depth map in which depth values change along the object contour.

FIG. 8 exemplifies pixel values and initial depth values of pixels within the same range as in FIG. 2. The provisional clusterer 101 performs clustering to assign label information 13 indicating class 01 or 02 to each pixel. The representative pixel value calculator 102 calculates representative pixel values 14 of classes 01 and 02, and the representative depth value calculator 103 calculates representative depth values 15 of classes 01 and 02. As described above, a depth value of the correction target pixel p_x includes an error. However, a pixel value of the correction target pixel p_x is closer to the representative pixel value 14 of class 01 than that of class 02. Therefore, since the depth corrector 104 replaces the depth value of the correction target pixel p_x by the representative depth value 15 of class 01, an error of the depth value of the correction target pixel p_x is reduced. According to the depth correction apparatus shown in FIG. 6, the corrected depth map 16 closer to the desired depth map map_d can be obtained.

As described above, the depth correction apparatus according to the first embodiment replaces a depth value of a correction target pixel by a representative depth value of a class having a representative pixel value closest to a pixel value of the correction target pixel. Therefore, according to the depth correction apparatus of this embodiment, even when an initial depth value of a correction target pixel located near an object contour includes an error, this error can be reduced to improve the quality of a 3D image.

Note that an already corrected pixel may be included in the calculation block upon sequentially processing the correction target block. In such case, the corrected depth value may be used or a depth value before correction (initial depth value) may be used. According to the former case, a local region in the initial depth map 12 is sequentially updated. According to the latter case, the corrected depth map 16 to be output is held independently of the initial depth map 12.

Also, the same pixel may be included in the correction target block a plurality of times (that is, the depth value of the same pixel may be corrected a plurality of times). Upon performance of correction a plurality of times, the previous corrected depth map 16 is input as the initial depth map 12. Upon performance of correction a plurality of times, the size of the correction target block or calculation block may be sequentially changed, or the value of K may be sequentially changed.

(Second Embodiment)

As shown in FIG. 9, a depth correction apparatus according to the second embodiment includes a provisional clusterer 101, pixel value statistic calculator 202, representative depth value calculator 103, and depth corrector 204. The depth correction apparatus shown in FIG. 9 receives, as inputs, a 2D image 11 and an initial depth map 12 which specifies (initial) depth values of respective pixels of the 2D image 11, and obtains a corrected depth map 26.

As in the first embodiment, the provisional clusterer 101 applies clustering to at least either of pixel values and depth values of a plurality of pixels in a calculation block, and classifies this plurality of pixels into K classes. The provisional clusterer 101 assigns label information 13 indicating a belonging class to each of the plurality of pixels in the calculation block. The provisional clusterer 101 notifies the pixel value statistic calculator 202, representative depth value calculator 103, and depth corrector 204 of this label information 13.

The pixel value statistic calculator 202 calculates pixel value statistics 24 of respective classes according to the label information 13. The pixel value statistic calculator 202 inputs the pixel value statistics 24 of the respective classes to the depth corrector 204. In this case, the pixel value statistic 24 is a value calculated by statistically analyzing pixel values of each class. Therefore, the aforementioned representative pixel value 14 can be considered as a kind of pixel value statistic 24. In the following description, a histogram of pixel values of each class is used as the pixel value statistic 24.

The pixel value statistic calculator 202 may create a histogram faithful to the distribution of pixel values of pixels which belong to each class, or may approximate the distribution of pixel values of pixels which belong to each class to a normal distribution according to:

$$\eta(k, I) = \frac{1}{\left(\sqrt{2\pi}\right)^m \sqrt{|s_k|}} \exp\left(-\frac{1}{2}(I - \mu_k)^T s_k^{-1}(I - \mu_k)\right) \quad (11)$$

where m represents the number of dimensions of a pixel value vector I, $\mu_k$ represents a mean vector of pixel values of pixels which belong to a class indicated by label information (=k), and $S_k$ represents a variance-covariance matrix of the pixel values of the pixels which belong to the class indicated by the label information (=k). Also, T is a symbol that means transposition of a vector, and −1 is a symbol that means an inverse matrix.

The depth corrector 204 determines a corresponding class of a correction target pixel in a correction target block based on a pixel value of the correction target pixel, the pixel value statistics 24 of the respective classes, and pixel values of surrounding pixels of the correction target pixel. The depth corrector 204 replaces a depth value of the correction target pixel by a representative depth value 15 of the corresponding class. The depth corrector 204 obtains the corrected depth map 26 of the correction target block by replacing depth values of all correction target pixels in the correction target block by the representative depth values 15 of their corresponding classes.

The aforementioned depth corrector 104 does not consider any spatial correlations of pixel values between the correction target pixel and its surrounding pixels in determination of the corresponding class of the correction target pixel. However, it is normally known that the 2D image 11 includes spatial continuity of pixel values. Therefore, in consideration of spatial correlations of pixel values between the correction target pixel and its surrounding pixels, for example, the determination accuracy of an object contour is improved.

More specifically, the depth corrector 204 derives a combination of k which minimize an energy function E (that is, a combination of corresponding classes of respective pixels in the calculation block). The energy function E is given by:

$$E = \sum_{j \in B_C} g(j, k) + \sum_{j \in B_C} \sum_{l \in \Omega(j)} e(j, l) \quad (12)$$

where g(j, k) is a function which evaluates a (logarithm) likelihood that a class of label information (=k) is a corresponding class of a correction target pixel specified by a position vector j, using a pixel value of the correction target pixel and the pixel value statistics 24 of the respective classes. The likelihood function g(j, k) exhibits a smaller value with increasing likelihood. e(j, l) is a function which represents a spatial correlation of pixel values between the correction target pixel of the position vector j and each surrounding pixel of a position vector 1. The correlation function e(j, l) exhibits a smaller value with increasing spatial correlation. $\Omega(j)$ represents a set of the position vectors 1 of surrounding pixels of the correction target pixel specified by the position vector j.

If the pixel value statistic 24 is a histogram of pixel values of pixels which belong to each class, the likelihood function g(j, k) is derived, for example, by:

$$g(j, k) = -\log \frac{h(k, I(j))}{N(k)} \quad (13)$$

where h(k, I) represents a histogram of pixel values of pixels which belong to a class indicated by label information (=k). h(k, I(j)) represents a frequency of a pixel value I(j) in this histogram h(k, I).

If the pixel value statistic 24 is a normal distribution calculated by expression (11) above, the likelihood function g(j, k) is derived, for example, by:

$$g(j,k) = -\log \eta(k, I(j)) \quad (14)$$

The correlation function e(j, l) is derived, for example, by:

$$e(j, l) = \gamma \frac{[LABEL(j) \neq LABEL(l)?] \exp(-\beta |I(j) - I(l)|_2)}{dis(j, l)} \quad (15)$$

Note that in expression (15), the L1 norm may be used in place of the L2 norm. Note that "[logical expression ?]" is a function which returns "1" if the logical expression holds, or "0" otherwise. $\gamma$ is a positive coefficient, which can be empirically set, and is set to be, for example, "10". $\beta$ represents a positive coefficient, and is set to be, for example, a variance of pixel values of the correction target pixel and surrounding pixels. dis(j, l) represents a spatial distance (for example, an Euclidean distance) between the correction target pixel of the position vector j and each surrounding pixel of the position vector l.

That is, if pieces of label information 13, which are assigned to the correction target pixel of the position vector j and each surrounding pixel of the position vector l, match, the correlation function e(j, l) yields "0". On the other hand, if these pieces of label information 13 do not match, the correlation function e(j, l) yields a smaller value with decreasing pixel value difference and spatial difference between the correction target pixel and surrounding pixel.

The depth corrector 204 can solve a minimization problem of the energy function E using an algorithm called a graph cut method. Note that the depth corrector 204 may solve the minimization problem of the energy function E using another algorithm such as Belief Propagation. An overview of the graph cut method will be described below with reference to FIG. 11.

Figure 11:
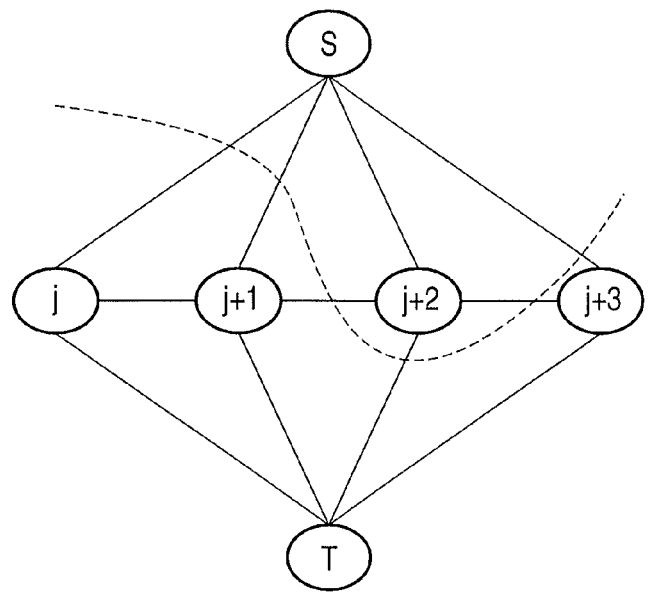
FIG. 11 is an explanatory view of a graph cut method.

In the following description, K=2 for the sake of simplicity. However, the same discussion applies even when K is expanded to 3 or more. In FIG. 11, let S and T be nodes for class determination. Also, let j, j+1, j+2, and j+3 be pixel nodes which indicate four pixels (position vectors are j, j+1, j+2, and j+3), which are arranged in line to be adjacent to each other. The respective pixel nodes and nodes S and T are coupled via edges. Weights (or they can be read as costs) c(S, j) and c(T, j) of the edges between the pixel node j and the nodes S and T are respectively specified by:

$$\begin{cases} c(S, j) = g(j, 1) \\ c(T, j) = g(j, 0) \end{cases} \quad (16)$$

Furthermore, the neighboring pixel nodes are coupled via edges. A weight c(j, j+1) between the pixel nodes j and j+1 is specified by:

$$c(j, j+1) = \gamma \frac{\exp(-\beta |I(j) - I(j+1)|_2)}{dis(j, j+1)} \quad (17)$$

Note that expression (17) corresponds to a case in which l=j+1 and LABEL(j)≠LABEL(l) are set in expression (15) above. In expression (17), the L1 norm may be used in place of the L2 norm. The depth corrector 204 solves a maximum flow minimum cut problem after it calculates the weights of the respective edges. When the maximum flow minimum cut problem is solved, the edge between each pixel node and one of the nodes S and T is cut (see a broken curve in FIG. 11). If an edge between a given pixel node and the node T is cut (that is, if an edge between that pixel node and the node S is maintained), the depth corrector 204 determines a class of k=0 as a corresponding class of a correction target pixel indicated by that pixel node. On the other hand, if an edge between a given pixel node and the node S is cut (that is, if an edge between that pixel node and the node T is maintained), the depth corrector 204 determines a class of k=1 as a corresponding class of a correction target pixel indicated by that pixel node. In the example of FIG. 11, the class of k=0 is determined as a corresponding class of a correction target pixel of the position vector j+2, and the class of k=1 is determined as a corresponding class of correction target pixels of the position vectors j, j+1, and j+3.

FIG. 10 exemplifies the operation of the depth correction apparatus in FIG. 9. The operation exemplified in FIG. 10 can be realized by respectively replacing steps S114 and S116 in the operation exemplified in FIG. 7 by steps S214 and S216 to be described below.

In step S214, the pixel value statistic calculator 202 calculates pixel value statistics 24 of respective classes according to the label information 13 assigned in step S113. After this step S214 and step S115 described above, the process advances to step S216.

In step S216, the depth corrector 204 corrects depth values of correction target pixels in the correction target block, thus ending the processing. As described above, the depth corrector 204 determines a corresponding class of a correction target pixel in consideration of spatial correlations with surrounding pixels in addition to likelihoods of respective classes based on the pixel value statistics 24. The depth corrector 204 then replaces the depth value of the correction target pixel by the representative depth value 15 of the corresponding class.

As described above, the depth correction apparatus according to the second embodiment determines a corresponding class of a correction target pixel in consideration of spatial correlations between the correction target pixel and its surrounding pixels in addition to the likelihoods of respective classes based on the pixel value statistics. Therefore, the depth correction apparatus according to this embodiment can realize effective depth correction using the spatial continuity of pixel values in a 2D image.

(Third Embodiment)

Figure 13:
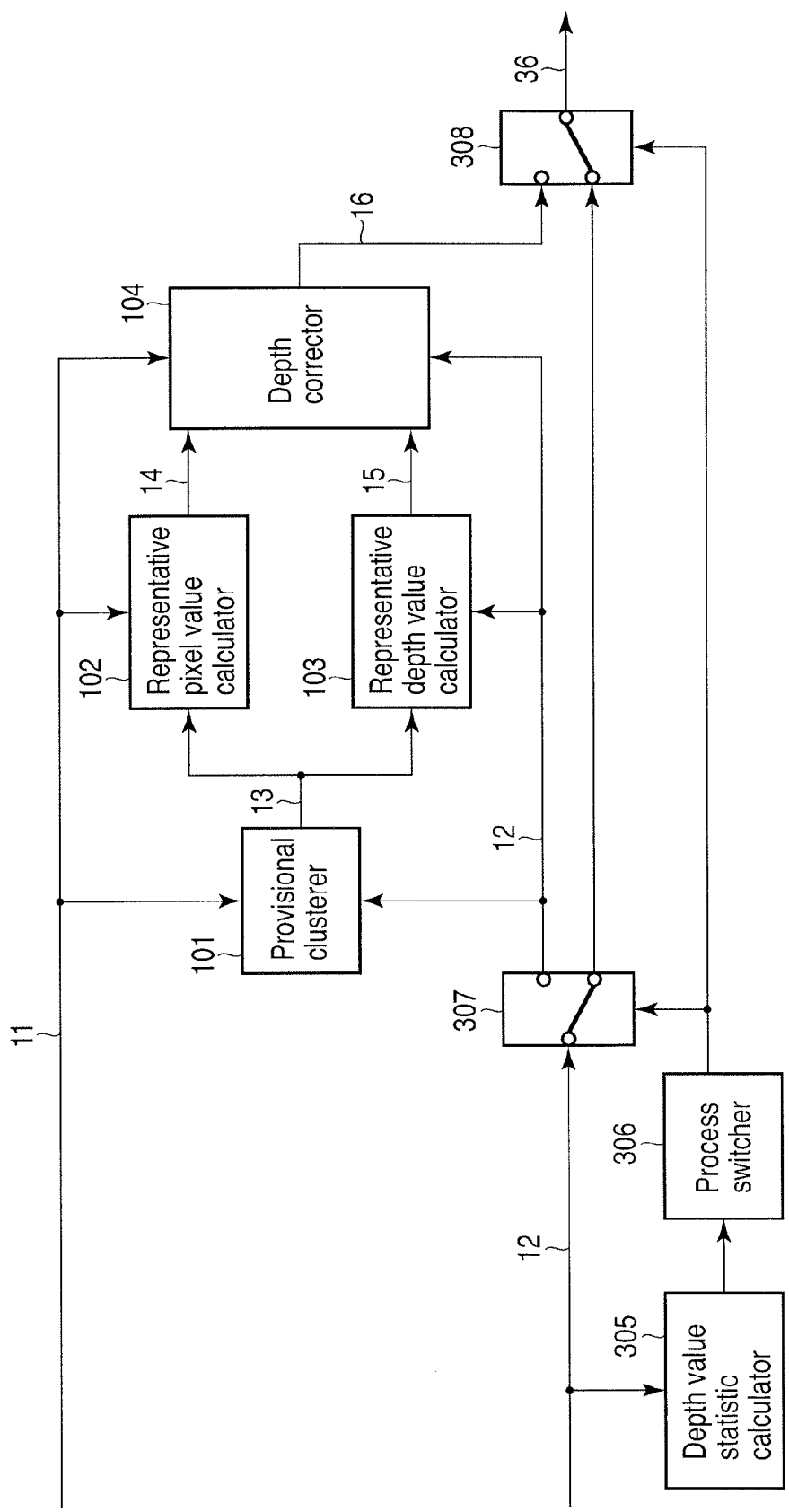
FIG. 13 is a block diagram showing an example of a depth correction apparatus according to the third embodiment.

As shown in FIG. 13, a depth correction apparatus according to the third embodiment includes a provisional clusterer 101, representative pixel value calculator 102, representative depth value calculator 103, depth corrector 104, depth value statistic calculator 305, process switcher 306, and selectors 307 and 308. The depth correction apparatus shown in FIG. 13 receives, as inputs, a 2D image 11 and an initial depth map 12 which specifies (initial) depth values of respective pixels of the 2D image 11, and obtains an output depth map 36.

The depth correction according to the aforementioned first embodiment is effective when a calculation block includes an object contour. On the other hand, that depth correction is not always effective when depth values change smoothly in the calculation block.

Figure 12:
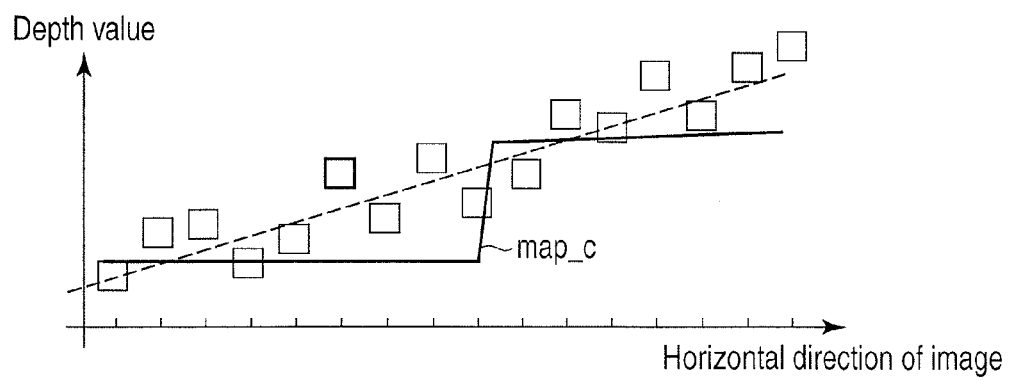
FIG. 12 is an explanatory view of an initial depth map in which depth values change moderately.

For example, in an initial depth map shown in FIG. 12, depth values (indicated by square marks) of respective pixels change smoothly, as indicated by a broken line. The depth correction according to the first embodiment corrects this initial depth map to a stepped depth map map_c. This corrected depth map map_c causes mach bands of depth values, and may rather deteriorate the quality of a 3D image. This embodiment adaptively applies the depth correction according to the first embodiment, thereby reducing errors of initial depth values near an object contour while avoiding excessive correction.

The depth value statistic calculator 305 acquires the initial depth map 12, and calculates a depth value statistic of pixels in a calculation block. The depth value statistic calculator 305 inputs the depth value statistic to the process switcher 306. The depth value statistic is an index indicating the magnitudes of high-frequency components of pixels in a calculation block.

The depth value statistic may be, for example, a sample variance of depth values of pixels in a calculation block. The depth value statistic may be a sequence of high-frequency component values (output signal values) obtained by applying high-pass filter processing to depth values of pixels in a calculation block (or it may be a sum total, average value, or median value of the sequence, or may be a ratio of high-frequency component values which exceed a predetermined threshold in the sequence). Alternatively, the depth value statistic may be high-frequency component values obtained by applying DCT (discrete cosine transform) to depth values of pixels in a calculation block.

When depth values of pixels in a calculation block have large high-frequency components, this means that the depth values of the pixels in that calculation block change sharply. That is, this calculation block is more likely to include an object contour (or it can be read as an edge). Therefore, by applying the depth correction to this calculation block, it is expected that errors of initial depth values are effectively reduced.

On the other hand, when depth values of pixels in a calculation block have small high-frequency components, this means that the depth values of the pixels in that calculation block change moderately. That is, this calculation block is unlikely to include any object contour. Therefore, when the depth correction is applied to this calculation block, a smooth change in initial depth value is corrected to a stepped pattern, and mach bands may be caused.

The process switcher 306 controls an output from the selector 307 and an input to the selector 308 in accordance with the depth value statistic from the depth value statistic calculator 305. For example, the process switcher 306 compares the depth value statistic with a predetermined threshold. When the depth value statistic is equal to or larger than the threshold, the process switcher 306 controls the selector 307 to output the initial depth map 12 to the provisional clusterer 101, representative depth value calculator 103, and depth corrector 104, and controls the selector 308 to receive a corrected depth map 16 from the depth corrector 104. On the other hand, when the depth value statistic is less than the threshold, the process switcher 306 controls the selector 307 to output the initial depth map 12 to the selector 308, and controls the selector 308 to receive the initial depth map 12 from the selector 307.

The selector 307 selects an output destination of the initial depth map 12 under the control of the process switcher 306. When the selector 307 outputs the initial depth map 12 to the provisional clusterer 101, representative depth value calculator 103, and depth corrector 104, the depth correction according to the first embodiment is applied to a correction target block. On the other hand, when the selector 307 outputs the initial depth map 12 to the selector 308, the depth correction of a correction target block is skipped.

The selector 308 selectively receives one of the corrected depth map 16 and initial depth map 12 under the control of the process switcher 306. The selector 308 outputs the received depth map as the output depth map 36 of a correction target block.

Figure 14:
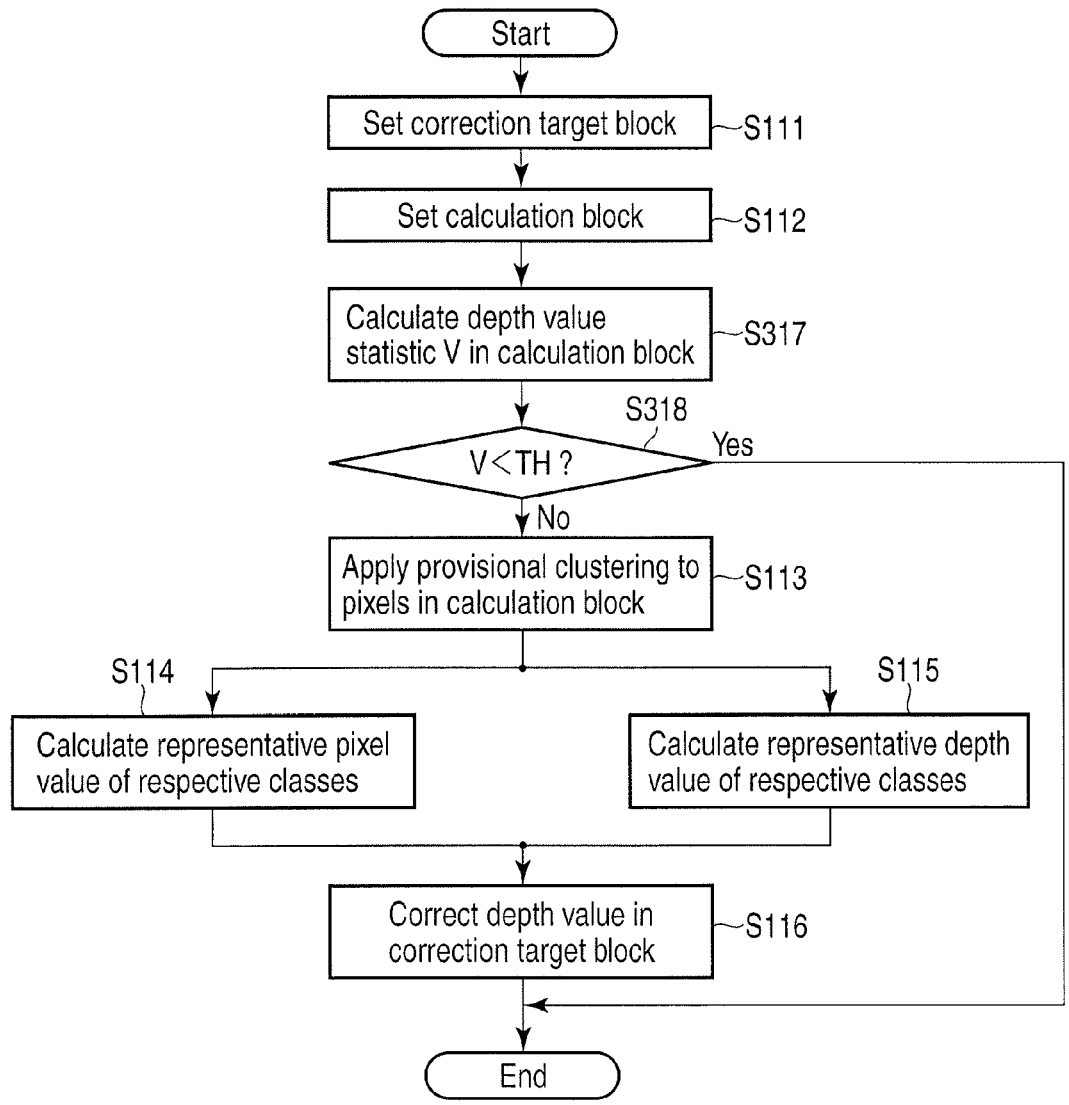
FIG. 14 is a flowchart showing an example of the operation of the depth correction apparatus shown in FIG. 13.

FIG. 14 exemplifies the operation of the depth correction apparatus shown in FIG. 13. The operation exemplified in FIG. 14 can be realized by adding steps S317 and S318 to be described below to the operation exemplified in FIG. 7.

After the end of steps S111 and S112, the process advances to step S317. In step S317, the depth value statistic calculator 305 acquires the initial depth map 12, and calculates a depth value statistic V of pixels in a calculation block. As described above, the depth value statistic V is an index which represents the magnitudes of high-frequency components of the depth values of the pixels in the calculation block (for example, a sample variance of the depth values of the pixels in the calculation block).

The process switcher 306 compares the depth value statistic V calculated in step S317 with a predetermined threshold TH (step S318). If V<TH, the depth correction is skipped, and the processing ends. If V≥TH, the depth correction is enabled, and the process advances to step S113.

As described above, the depth correction apparatus according to the third embodiment determines whether or not a correction target block is suited to correction, and adaptively applies the depth correction according to the first embodiment. Therefore, according to the depth correction apparatus of this embodiment, errors of initial depth values near an object contour can be mainly reduced by the depth correction according to the first embodiment, while avoiding excessive correction.

Note that this embodiment uses a depth value statistic. However, an index required to determine whether or not a calculation region includes an object contour (or whether or not it is a region in which depth values change smoothly) is not limited to this. Therefore, the depth value statistic calculator 305 may be read as a functional unit which calculates such index based on the initial depth map 12 or 2D image 11 as needed.

(Fourth Embodiment)

Figure 15:
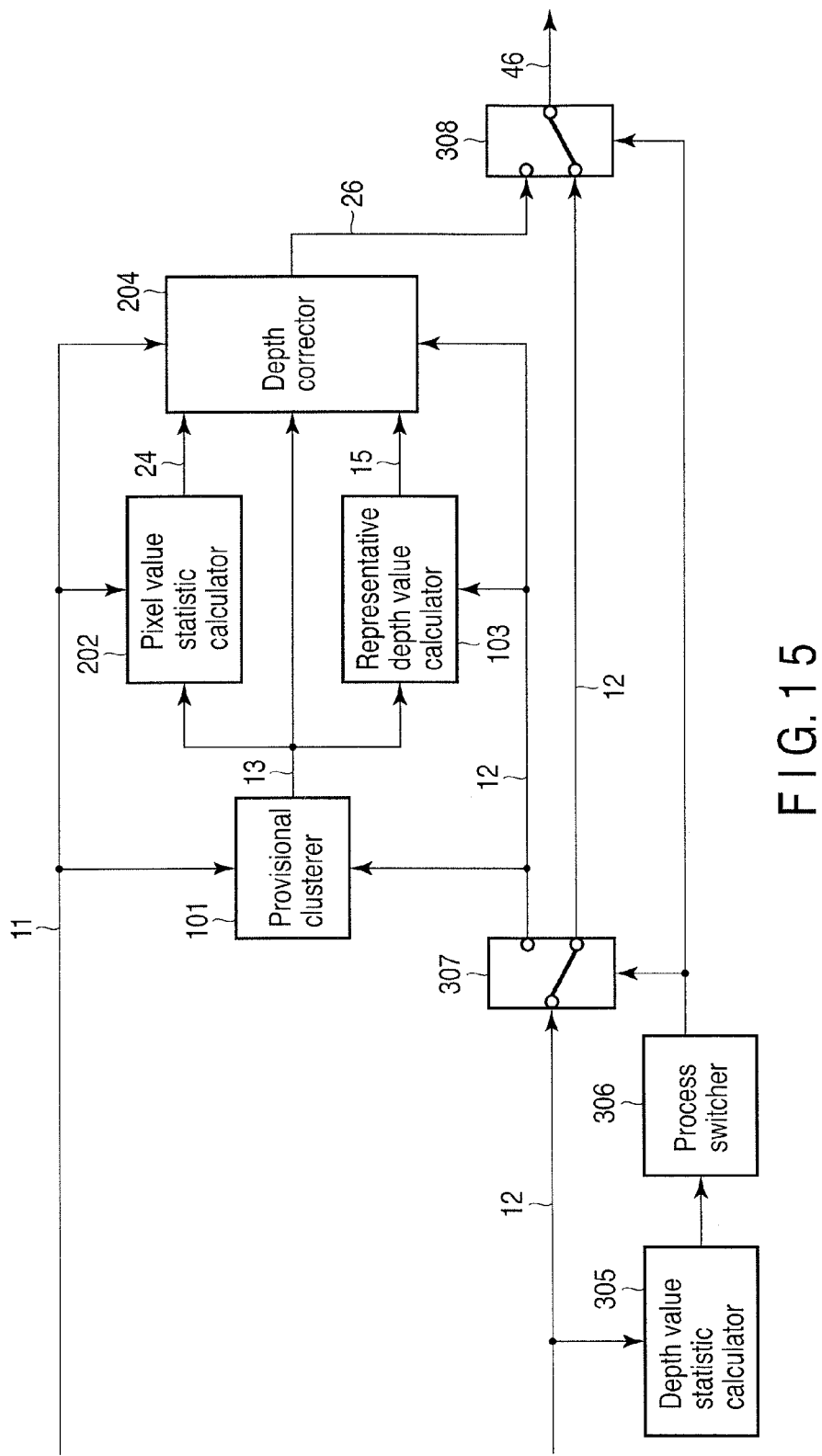
FIG. 15 is a block diagram showing an example of a depth correction apparatus according to the fourth embodiment.

As shown in FIG. 15, a depth correction apparatus according to the fourth embodiment includes a provisional clusterer 101, pixel value statistic calculator 202, representative depth value calculator 103, depth corrector 204, depth value statistic calculator 305, process switcher 306, and selectors 307 and 308. The depth correction apparatus shown in FIG. 15 receives, as inputs, a 2D image 11 and an initial depth map 12 which specifies (initial) depth values of respective pixels of the 2D image 11, and obtains an output depth map 46.

The depth correction according to the aforementioned second embodiment is effective when a calculation block includes an object contour, as in the depth correction according to the first embodiment. On the other hand, such depth correction is not always effective when depth values change smoothly in a calculation block. That is, the depth correction according to the second embodiment may cause mach bands of depth values according to the circumstances, and may rather deteriorate the quality of a 3D image. In this embodiment, by adaptively applying the depth correction according to the second embodiment, errors of initial depth values near an object contour are reduced while avoiding excessive correction.

The process switcher 306 controls an output from the selector 307 and an input to the selector 308 in accordance with a depth value statistic from the depth value statistic calculator 305 as in the third embodiment. For example, the process switcher 306 compares the depth value statistic with a predetermined threshold. When the depth value statistic is equal to or larger than the threshold, the process switcher 306 controls the selector 307 to output the initial depth map 12 to the provisional clusterer 101, representative depth value calculator 103, and depth corrector 204, and controls the selector 308 to receive a corrected depth map 26 from the depth corrector 204.

As in the third embodiment, the selector 307 selects an output destination of the initial depth map 12 under the control of the process switcher 306. When the selector 307 outputs the initial depth map 12 to the provisional clusterer 101, representative depth value calculator 103, and depth corrector 204, the depth correction according to the second embodiment is applied to a correction target block.

As in the third embodiment, the selector 308 selectively receives one of the corrected depth map 26 and initial depth map 12 under the control of the process switcher 306. The selector 308 outputs the received depth map as the output depth map 46 of a correction target block.

Figure 16:
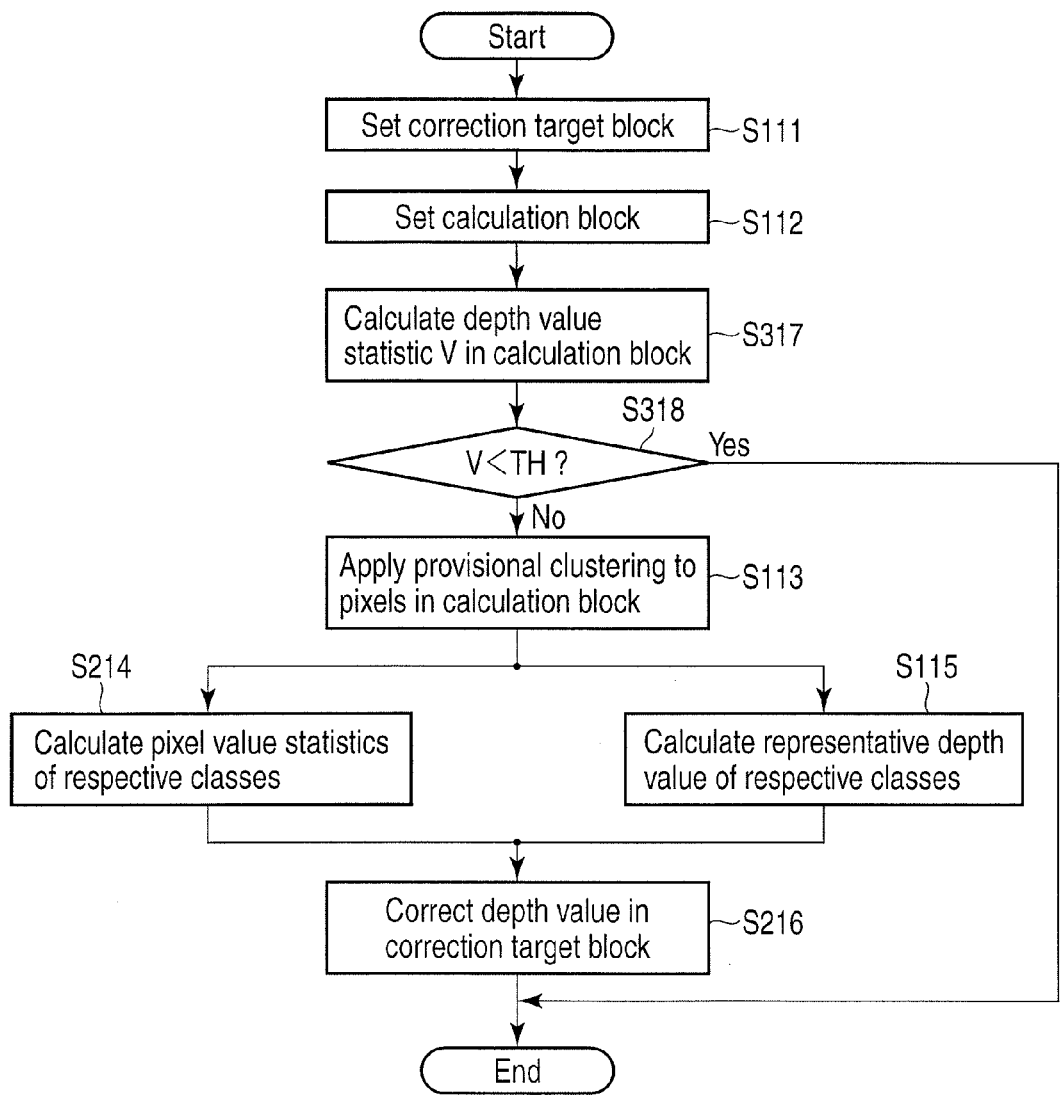
FIG. 16 is a flowchart showing an example of the operation of the depth correction apparatus shown in FIG. 15.

FIG. 16 exemplifies the operation of the depth correction apparatus shown in FIG. 15. The operation exemplified in FIG. 16 can be realized by respectively replacing steps S114 and S116 in the operation exemplified in FIG. 14 by steps S214 and S216 in FIG. 10.

As described above, the depth correction apparatus according to the fourth embodiment determines whether or not a correction target block is suited to correction, and adaptively applies the depth correction according to the second embodiment. Therefore, according to the depth correction apparatus of this embodiment, errors of initial depth values near an object contour can be mainly reduced by the depth correction according to the second embodiment, while avoiding excessive correction.

(Fifth Embodiment)

Figure 17:
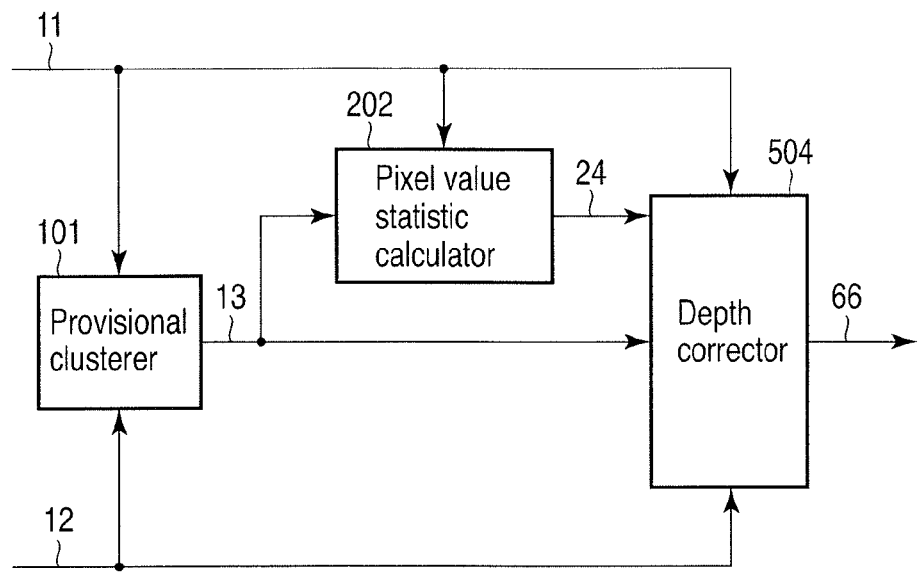
FIG. 17 is a block diagram showing an example of a depth correction apparatus according to the fifth embodiment.

As shown in FIG. 17, a depth correction apparatus according to the fifth embodiment includes a provisional clusterer 101, pixel value statistic calculator 202, and depth corrector 504. The depth correction apparatus shown in FIG. 17 receives, as inputs, a 2D image 11 and an initial depth map 12 which specifies (initial) depth values of respective pixels of the 2D image 11, and obtains a corrected depth map 56.

The depth correction apparatus according to each of the aforementioned first to fourth embodiments performs correction that replaces a depth value of a correction target pixel by a representative depth value 15 of a corresponding class. However, the depth value of the correction target pixel can be corrected by another method.

As in the aforementioned depth corrector 204, the depth corrector 504 determines a corresponding class of a correction target pixel in a correction target block based on a pixel value of the correction target pixel, pixel value statistics 24 of respective classes, and pixel values of surrounding pixels of the correction target pixel, and updates label information of the correction target pixel. Then, the depth corrector 504 corrects a depth value z(i) of the correction target pixel of a position vector i, for example, according to:

$$z(i) = \frac{1}{N(\text{LABEL}(i))} \sum_{j \in W(i)} [\text{LABEL}(i) = \text{LABEL}(j)?] z(j) \quad (18)$$

where W(i) represents a set of position vectors j of surrounding pixels of the correction target pixel of the position vector i. N(LABEL(i)) in expression (18) is given by:

$$N(\text{LABEL}(i)) = \sum_{j \in W(i)} [\text{LABEL}(i) = \text{LABEL}(j)?] \quad (19)$$

Alternatively, the depth corrector 504 may correct the depth value z(i) of the correction target pixel of the position vector i, for example, according to:

$$z(i) = \frac{1}{N_s(\text{LABEL}(i))} \sum_{j \in W(i)} \frac{[\text{LABEL}(i) = \text{LABEL}(j)?] z(j)}{dis(i,j)} \quad (20)$$

According to expression (20), depth correction which further reflects spatial continuity of an image can be realized.

$N_S$(LABEL(i)) in expression (20) is given by:

$$N_s(\text{LABEL}(i)) = \sum_{j \in W(i)} \frac{[\text{LABEL}(i) = \text{LABEL}(j)?]}{dis(i,j)} \quad (21)$$

Figure 18:
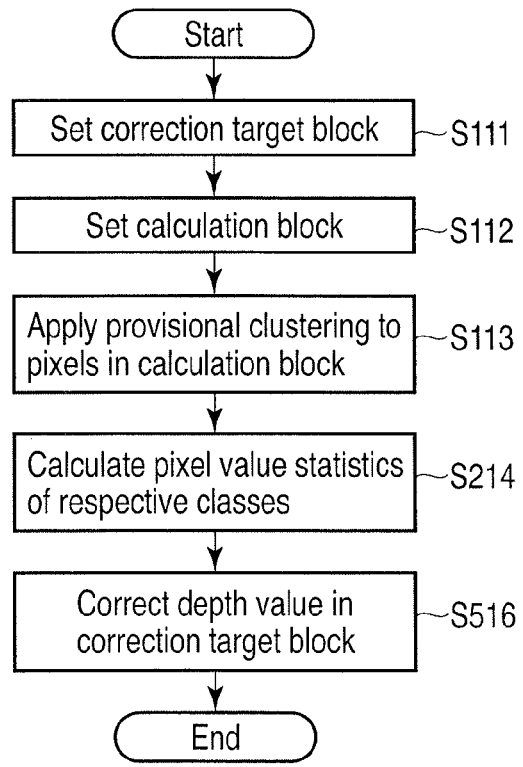
FIG. 18 is a flowchart showing an example of the operation of the depth correction apparatus shown in FIG. 17.

FIG. 18 exemplifies the operation of the depth correction apparatus shown in FIG. 17. The operation exemplified in FIG. 18 can be attained by removing step S115 from the operation exemplified in FIG. 10, and replacing step S116 by step S516 to be described below.

In step S516, the depth corrector 504 corrects depth values of respective correction target pixels in the correction target block, thus ending the processing. As described above, the depth corrector 504 determines a corresponding class of a correction target pixel in consideration of spatial correlations with surrounding pixels in addition to likelihoods of respective classes based on pixel value statistics 24, and updates label information of the correction target pixel. Then, the depth corrector 504 corrects the depth value of the correction target pixel using depth values of surrounding pixels whose corresponding class matches that of the correction target pixel.

As described above, the depth correction apparatus according to the fifth embodiment corrects a depth value of a correction target pixel using those of surrounding pixels whose corresponding class matches that of the correction target pixel. Therefore, the depth correction apparatus according to this embodiment can realize correction in consideration of spatial continuity of an image.

(Sixth Embodiment)

Figure 19:
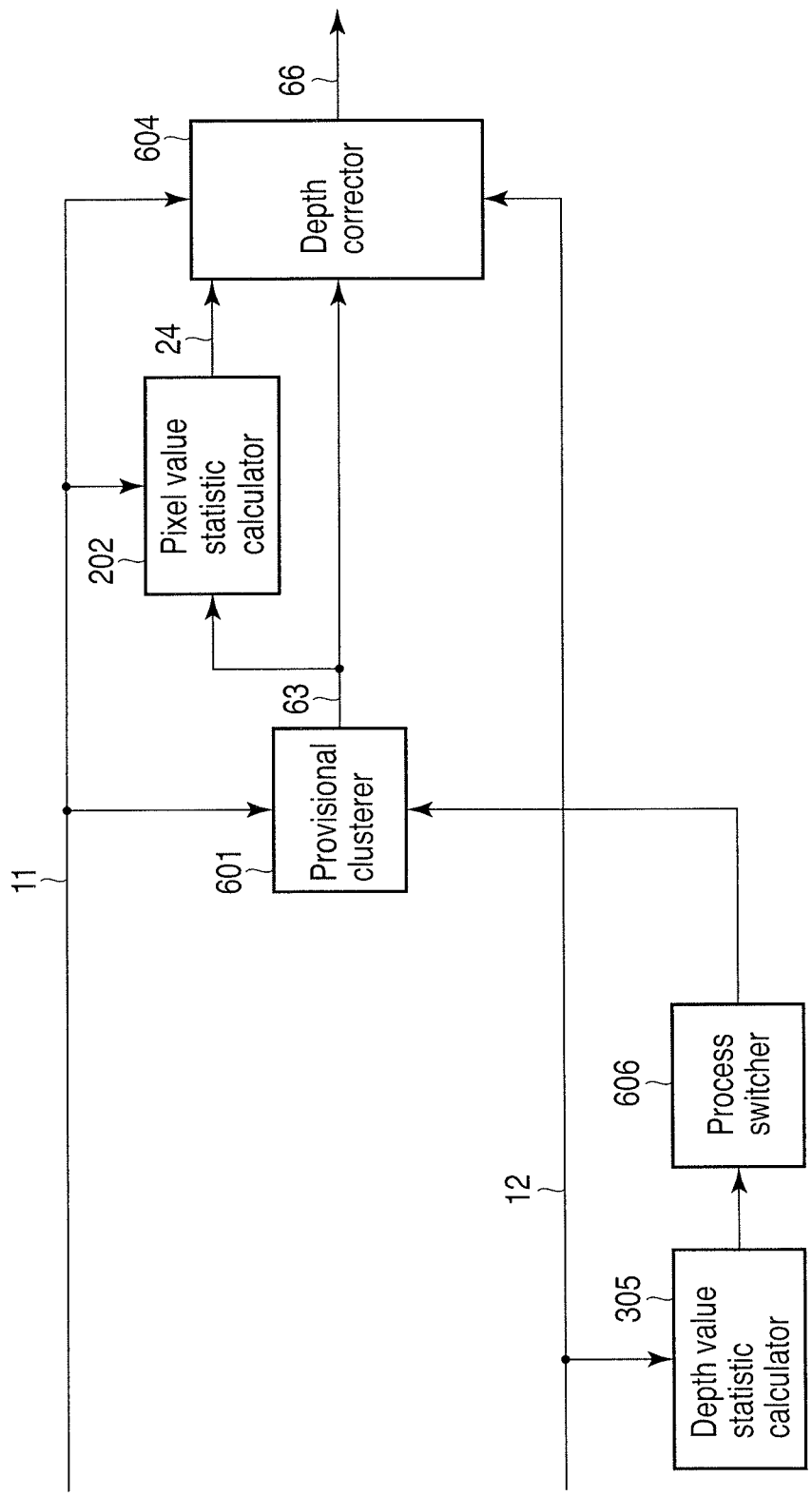
FIG. 19 is a block diagram showing an example of a depth correction apparatus according to the sixth embodiment.

As shown in FIG. 19, a depth correction apparatus according to the sixth embodiment includes a provisional clusterer 601, pixel value statistic calculator 202, depth corrector 604, depth value statistic calculator 305, and process switcher 606. The depth correction apparatus shown in FIG. 19 receives, as inputs, a 2D image 11 and an initial depth map 12 which specifies (initial) depth values of respective pixels of the 2D image 11, and obtains a corrected depth map 66.

The process switcher 606 compares a depth value statistic with a predetermined threshold, as in the aforementioned process switcher 306. When the depth value statistic is equal to or larger than the threshold, the process switcher 606 inputs a NOT_THROUGH flag to the provisional clusterer 601. On the other hand, when the depth value statistic is less than the threshold, the process switcher 606 inputs a THROUGH flag to the provisional clusterer 601.

Upon reception of the NOT_THROUGH flag from the process switcher 606, the provisional clusterer 601 performs provisional clustering which is the same as or similar to that of the aforementioned provisional clusterer 101. On the other hand, upon reception of the THROUGH flag from the process switcher 606, the provisional clusterer 601 assigns a THROUGH label to all pixels in a calculation block. The provisional clusterer 601 notifies the pixel value statistic calculator 202 and depth corrector 604 of label information 63 assigned to a plurality of pixels in the calculation block.

When the provisional clustering has been performed, the depth corrector 604 determines a corresponding class of a correction target pixel in a correction target block based on a pixel value of the correction target pixel, pixel value statistics 24 of respective classes, and pixel values of surrounding pixels of the correction target pixel, and updates label information of the correction target pixel, as in the aforementioned depth corrector 504. On the other hand, when the provisional clustering is skipped (that is, when the THROUGH label is assigned to all the pixels in the calculation block), the depth corrector 604 skips updating of label information.

Then, the depth corrector 604 corrects a depth value z(i) of the correction target pixel of a position vector i, for example, according to:

$$z(i) = \frac{1}{N'(\text{LABEL}(i))} \sum_{j \in W(i)} \left[ \begin{array}{l} \text{LABEL}(i) = \text{LABEL}(j) \lor \\ \text{LABEL}(j) = \text{THROUGH}? \end{array} \right] z(j) \quad (22)$$

where ∨ represents OR (logical add). N'(LABEL(i)) in expression (22) is given by:

$$N'(\text{LABEL}(i)) = \sum_{j \in W(i)} \left[ \begin{array}{l} \text{LABEL}(i) = \text{LABEL}(j) \lor \\ \text{LABEL}(j) = \text{THROUGH}? \end{array} \right] \quad (23)$$

Alternatively, the depth corrector 604 may correct the depth value z(i) of the correction target pixel of the position vector i, for example, according to:

$$z(i) = \frac{1}{N'_s(\text{LABEL}(i))} \sum_{j \in W(i)} \frac{\left[ \begin{array}{l} \text{LABEL}(i) = \text{LABEL}(j) \lor \\ \text{LABEL}(j) = \text{THROUGH}? \end{array} \right] z(j)}{dis(i, j)} \quad (24)$$

According to expression (24), depth correction that further reflects spatial continuity of an image can be realized.

$N'_s(\text{LABEL}(i))$ in expression (24) is given by:

$$N'_s(\text{LABEL}(i)) = \sum_{j \in W(i)} \frac{\left[ \begin{array}{l} \text{LABEL}(i) = \text{LABEL}(j) \lor \\ \text{LABEL}(j) = \text{THROUGH}? \end{array} \right]}{dis(i, j)} \quad (25)$$

Note that the depth corrector 604 may perform correction according to expression (18) or (20) described above. Also, when the provisional clustering is skipped (that is, when the THROUGH label is assigned to all the pixels in the calculation block), the depth corrector 504 may skip correction of the depth value.

Figure 20:
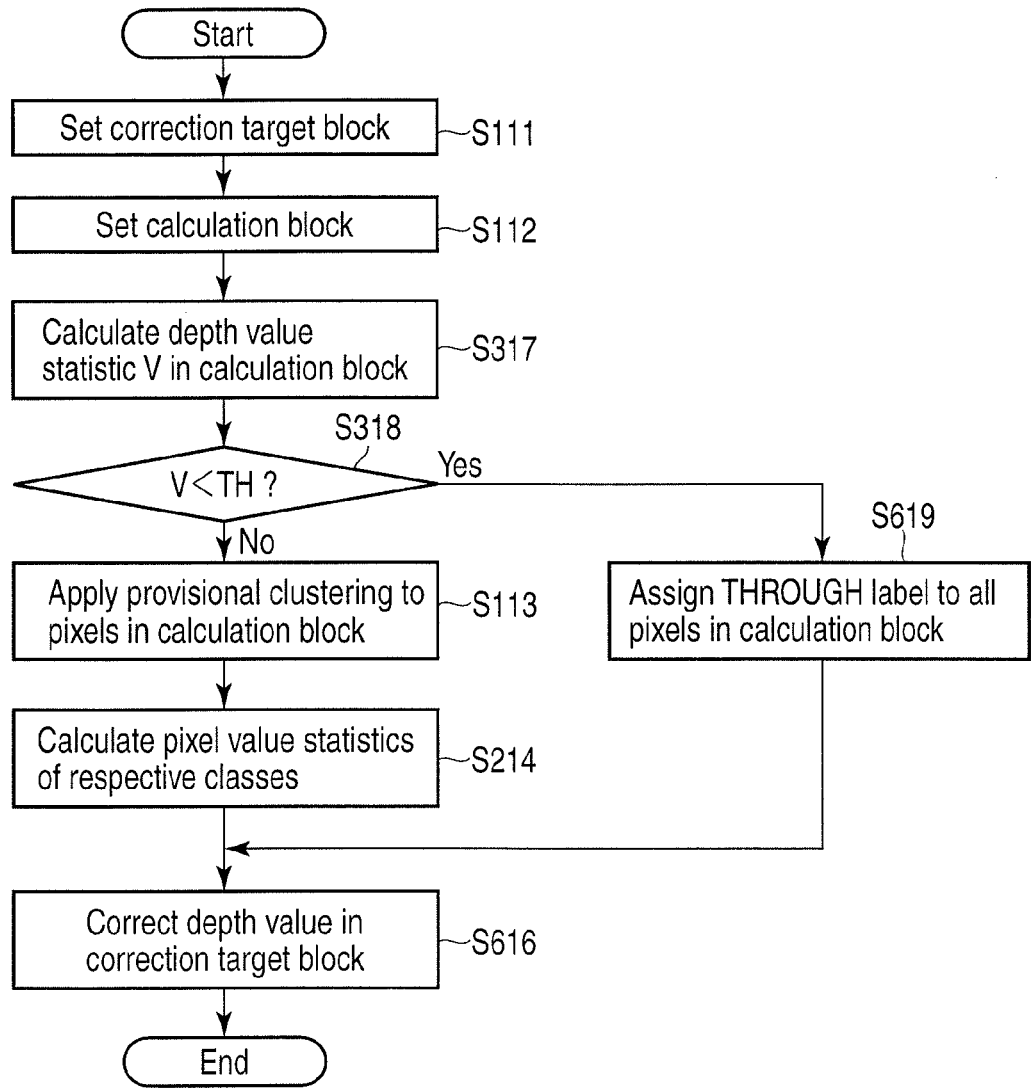
FIG. 20 is a flowchart showing an example of the operation of the depth correction apparatus shown in FIG. 19.

FIG. 20 exemplifies the operation of the depth correction apparatus shown in FIG. 19. The operation exemplified in FIG. 20 can be realized by removing step S115 from the operation exemplified in FIG. 16, adding step S619 to be described below, and replacing step S216 by step S616 to be described below.

The process switcher 606 compares a depth value statistic V calculated in step S317 with a predetermined threshold TH (step S318). If V<TH, the process advances to step S619. If V≥TH, the process advances to step S113.

In step S619, the provisional clusterer 601 assigns a THROUGH label to all pixels in a calculation block, and the process advances to step S616.

In step S616, the depth corrector 604 corrects depth values of respective correction target pixels in a correction target block, thus ending the processing. As described above, when step S214 is performed, the depth corrector 604 determines a corresponding class of a correction target pixel in consideration of spatial correlations with surrounding pixels in addition to likelihoods of respective classes based on pixel value statistics 24, and updates label information of the correction target pixel. On the other hand, when step S619 is performed, the depth corrector 604 skips updating of label information. Then, the depth corrector 604 corrects a depth value of a correction target pixel using depth values of surrounding pixels whose corresponding class matches that of the correction target pixel.

As described above, the depth correction apparatus according to the sixth embodiment adaptively applies the depth correction according to the fifth embodiment. Therefore, according to the depth correction apparatus of this embodiment, block distortions of depth values can be mainly reduced by the depth correction according to the fifth embodiment, while avoiding excessive correction.

The processing of each of the aforementioned embodiments can be implemented using a general-purpose computer as basic hardware. A program which implements the processing of each embodiment may be provided while being stored in a computer-readable storage medium. The program is stored in the storage medium as a file having an installable format or that having an executable format. The storage medium is not particularly limited as long as it can store the program and is readable by a computer. For example, a magnetic disk, optical disc (for example, a CD-ROM, CD-R, and DVD), magneto-optical disc (for example, an MO), and semiconductor memory may be used. Also, the program which implements the processing of each embodiment may be stored in a computer (server) connected to a network (for example, the Internet), and may be downloaded by another computer (client) via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A depth correction apparatus comprising:
   a clusterer configured to apply clustering to at least one of pixel values and depth values of a plurality of pixels in a calculation range corresponding to a correction target pixel, and to classify the plurality of pixels in the calculation range into a plurality of classes;
   a first calculator configured to calculate pixel value statistics of the respective classes using pixel values of pixels in the respective classes;
   a second calculator configured to calculate representative depth values of the respective classes using depth values of pixels in the respective classes;
   a corrector configured to determine a corresponding class of the correction target pixel based on a pixel value of the correction target pixel and the pixel value statistics of the respective classes, and to apply correction which replaces a depth value of the correction target pixel by a representative depth value of the corresponding class;
   a third calculator configured to calculate a depth value statistic which represents magnitudes of high-frequency components of depth values of the plurality of pixels in the calculation range; and
   a switch configured to switch, when the depth value statistic is less than a threshold, processing so as to skip correction of the depth value of the correction target pixel.

2. The apparatus according to claim 1, wherein the pixel value statistics of the respective classes are representative pixel values of the respective classes, and
   the corrector determines, as the corresponding class, a class having a representative pixel value which has a smallest distance from the pixel value of the correction target pixel.

3. The apparatus according to claim 2, wherein the distance is an absolute value of a difference of pixel values with the pixel value of the correction target pixel.

4. The apparatus according to claim 2, wherein the representative pixel value is an average value of pixel values of pixels in a class.

5. The apparatus according to claim 1, wherein the corrector determines the corresponding class based on likelihoods of the respective classes, which are evaluated by the pixel value statistics of the respective classes and the pixel value of the correction target pixel, and spatial corrections between the correction target pixel and surrounding pixels of the correction target pixel.

6. The apparatus according to claim 1, wherein the depth value statistic is a sample variance of depth values of the plurality of pixels in the calculation range.

7. The apparatus according to claim 1, wherein the depth value of the correction target pixel is corrected a plurality of times.

8. The apparatus according to claim 1, wherein the clusterer calculates a threshold from depth values of the plurality of pixels in the calculation range, classifies pixels having depth values larger than the threshold into a first class, and classifies pixels having depth values equal to or less than the threshold into a second class.

9. The apparatus according to claim 1, wherein the representative depth value is an average value of depth values of pixels in a class.

10. The apparatus according to claim 1, wherein the representative depth value is a median value of depth values of pixels in a class.

11. A depth correction apparatus comprising:
    a clusterer configured to apply clustering to at least one of pixel values and depth values of a plurality of pixels in a calculation range corresponding to a correction target pixel, and to classify the plurality of pixels in the calculation range into a plurality of classes;
    a first calculator configured to calculate pixel value statistics of the respective classes using pixel values of pixels in the respective classes;
    a corrector configured to determine a corresponding class of the correction target pixel based on a pixel value of the correction target pixel and the pixel value statistics of the respective classes, and to correct a depth value of the correction target pixel using depth values of surrounding pixels whose corresponding class matches the correction target pixel;
    a second calculator configured to calculate a depth value statistic which represents magnitudes of high-frequency components of depth values of the plurality of pixels in the calculation range; and
    a switcher configured to switch, when the depth value statistic is less than a threshold, processing so as to skip correction of the depth value of the correction target pixel.

12. A depth correction apparatus comprising:
    a first calculator configured to calculate a depth value statistic which represents magnitudes of high-frequency components of depth values of a plurality of pixels in a calculation range corresponding to a correction target pixel;
    a clusterer configured to apply, when the depth value statistic is equal to or larger than a threshold, clustering to at least one of pixel values and depth values of the plurality of pixels in the calculation range, and to classify the plurality of pixels in the calculation range into a plurality of classes;
    a second calculator configured to calculate pixel value statistics of the respective classes using pixel values of pixels in the respective classes;
    a corrector configured to determine a corresponding class of the correction target pixel based on a pixel value of the correction target pixel and the pixel value statistics of the respective classes, and to correct a depth value of the correction target pixel using depth values of surrounding pixels whose corresponding class matches the correction target pixel; and a switcher configured to switch, when the depth value statistic is less than a threshold, processing so as to skip correction of the depth value of the correction target pixel.

13. A depth correction method comprising:

applying clustering to at least one of pixel values and depth values of a plurality of pixels in a calculation range corresponding to a correction target pixel, and classifying the plurality of pixels in the calculation range into a plurality of classes;

calculating pixel value statistics of the respective classes using pixel values of pixels in the respective classes;

calculating representative depth values of the respective classes using depth values of pixels in the respective classes;

determining a corresponding class of the correction target pixel based on a pixel value of the correction target pixel and the pixel value statistics of the respective classes, and applying correction which replaces a depth value of the correction target pixel by a representative depth value of the corresponding class;

calculating a depth value statistic which represents magnitudes of high-frequency components of depth values of the plurality of pixels in the calculation range; and switching, when the depth value statistic is less than a threshold, processing so as to skip correction of the depth value of the correction target pixel.

* * * * *